Feb. 3. 1925.
G. W. STEIN
COMBINATION BRUSH AND SCRAPER
Filed Sept. 13, 1923
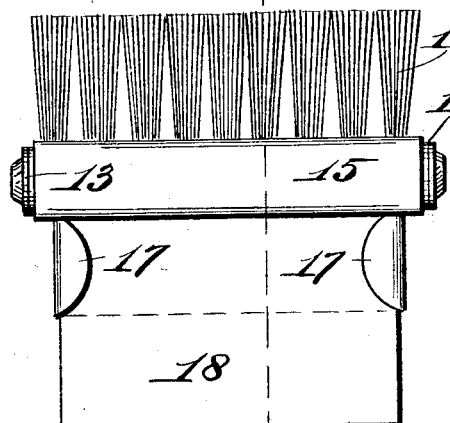
FIG. 1.
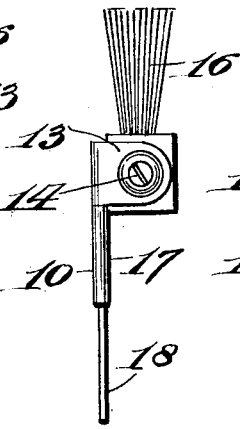
FIG. 2.
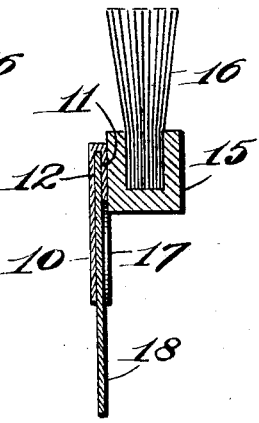
FIG. 3.
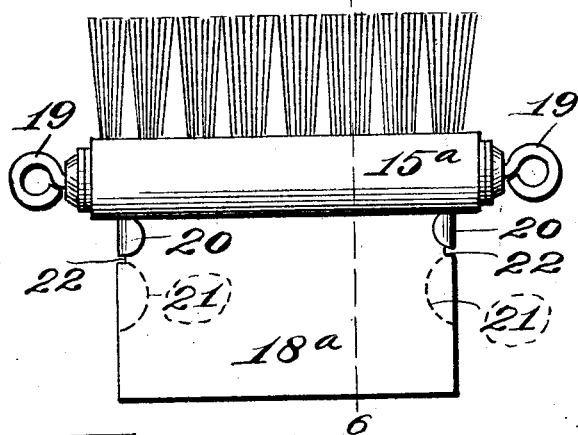
FIG. 4.
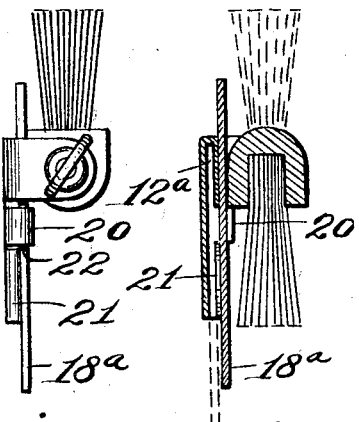
FIG. 5. FIG. 6.
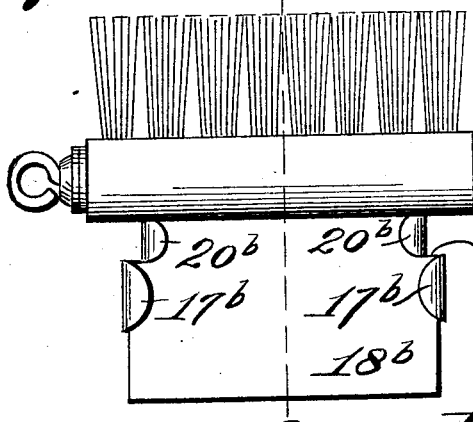
FIG. 7.
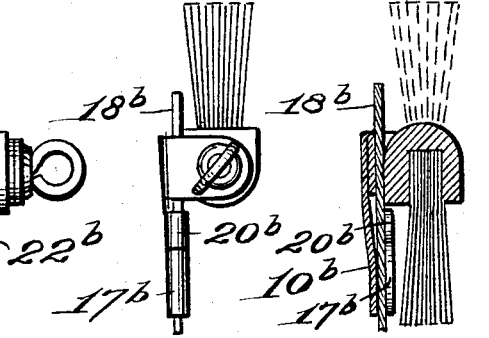
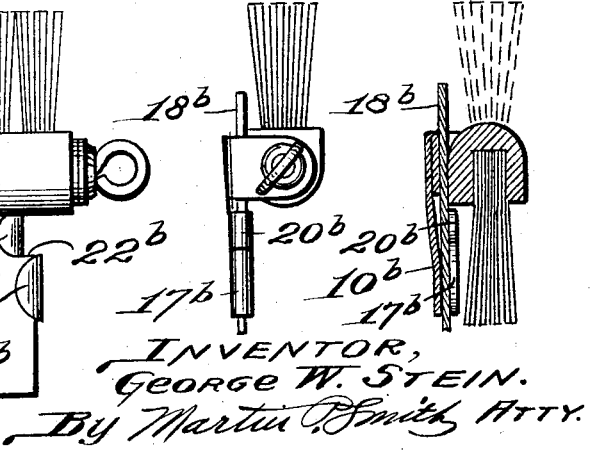
FIG. 8. FIG. 9.
INVENTOR,
GEORGE W. STEIN.
By Martin P. Smith ATTY.

Feb. 3. 1925.
G. W. STEIN
1,525,210
COMBINATION BRUSH AND SCRAPER
Filed Sept. 13, 1923  2 Sheets-Sheet 2
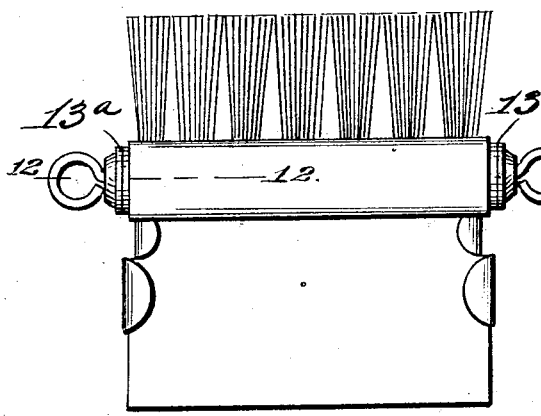
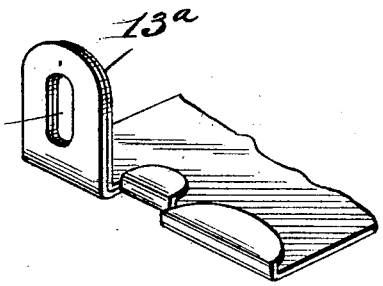
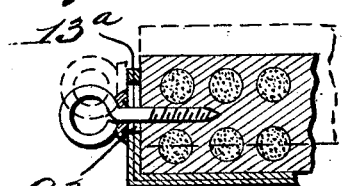
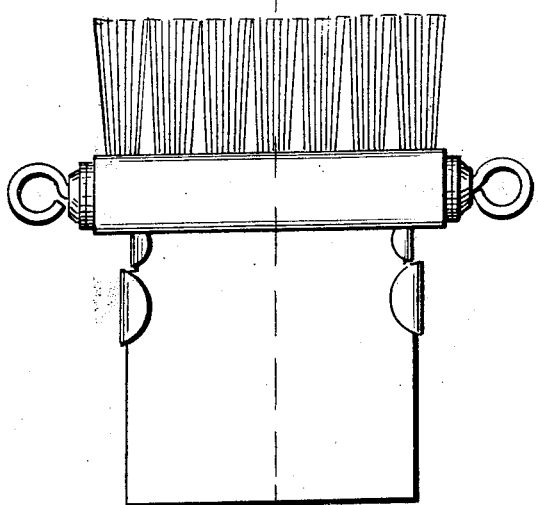
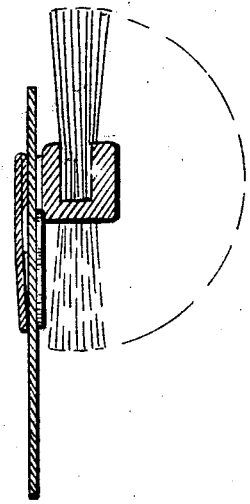
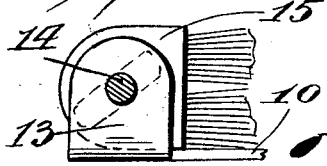

Patented Feb. 3, 1925.

1,525,210

UNITED STATES PATENT OFFICE.

GEORGE W. STEIN, OF LOS ANGELES, CALIFORNIA.

COMBINATION BRUSH AND SCRAPER.

Application filed September 13, 1923. Serial No. 662,419.

*To all whom it may concern:*

Be it known that I, GEORGE W. STEIN, a citizen of the United States, residing at Los Angeles, in the county of Los Angeles and State of California, have invented certain new and useful Improvements in Combination Brushes and Scrapers, of which the following is a specification.

My invention relates to a combination tool that embodies a steel scraping blade and a brush, the principal objects of my invention being to provide a simple, practical and convenient combination brush and scraper that is particularly designed for the use of butchers and meat cutters in scraping and cleaning the tops or cutting surfaces of meat blocks and tables; to provide a tool of the character described that is very compact, capable of being easily and cheaply produced and further, to provide a relatively simple form of holder or mounting for the scraping blade and brush.

With the foregoing and other objects in view, my invention consists in certain novel features of construction and arrangement of parts that will be hereinafter more fully described and claimed and illustrated in the accompanying drawings in which:

Figs. 1 and 2 are respectively front and end elevational views of my improved combination brush and scraper.

Fig. 3 is a vertical section taken on the line 3—3 of Fig. 1.

Figs. 4 and 5 are respectively, front and end elevational views of a modified form of the device.

Fig. 6 is a vertical section taken on the line 6—6 of Fig. 4.

Figs. 7 and 8 are respectively, front and end elevational views of a further modified form of the device.

Fig. 9 is a cross section taken on the line 9—9 of Fig. 7.

Fig. 10 is a front elevational view of a further modified form of the device.

Fig. 11 is a detail perspective view of a portion of the frame or holder that is used in the form of a device seen in Fig. 10.

Fig. 12 is a cross section taken on the line 12—12 of Fig. 10.

Fig. 13 is a front elevational view of a further modification.

Fig. 14 is a cross section taken on the line 14—14 of Fig. 13.

Fig. 15 is a detail view showing one manner of mounting the brush on the holder.

Referring by numerals to the accompanying drawings and particularly to the construction illustrated in Figs. 1, 2 and 3, the brush and scraping blade holder comprises a plate 10 of suitable sheet metal having a portion along one of its longer sides turned over or rebent to form a flange 11 that lies parallel with and spaced apart from the plate 10 to form a narrow pocket 12.

The ends of the rebent portion 11 and the adjacent portions of plate 10 are formed with integral extensions that are bent outwardly at right angles to the plane occupied by plate 10 to form ears 13.

Positioned between these ears 13 and secured thereto by screws 14 or the like is a block 15, preferably of wood that forms a brush back inasmuch as tufts of bristles such as 16 are seated in said block and project outwardly therefrom in a plane parallel with the plane occupied by plate 10.

Formed integral with the ends of plate 10, just below the ears 13 are inwardly bent ears 17 that are parallel with and spaced apart from said plate 10.

Removably positioned on plate 10, beneath ears 17 and with its upper edge occupying pocket 12 is a scraping plate 18, of steel or the like, the lower portion of which projects a substantial distance below the lower edge of plate 10.

The lower edge of this plate may serve as a scraping edge for scraping and cleaning the surfaces of butchers' blocks, meat cutting tables and the like and by turning the device upside down, the bristles of the brush may be used for brushing off the scraped surfaces.

Scraping plate 18 is removably arranged in the holder so that when one of the scraping edges becomes dull the plate may be removed and then re-positioned in said holder, thus bringing a new edge into position for use.

In the modified construction illustrated in Figs. 4, 5 and 6, the brush back 15$^a$ is pivotally connected to ears 13$^a$ by screw eyes 19, thus enabling the brush to be turned inwardly onto the holder and scraping plate as illustrated in Fig. 6.

These screw eyes provide simple means whereby the combination tool may be hung on a hook or nail while not in use.

In this construction the ends of plate 18$^a$ are formed with a pair of small inwardly bent ears 20, directly below the ears 13ª and below said ears 20 are formed larger ears 21 that are similar to ears 17.

The smaller ears 20, occupy a plane slightly in front of the ears 21.

In this construction the scraping plate 18ª may be positioned in the pocket 12ª at the upper edge of the holder and beneath the larger ears 21 as illustrated by dotted lines in Fig. 6, thereby exposing or arranging for use only one scraping edge or the plate may be placed on top of the larger ears and the flange 11ª, as illustrated by solid lines in Fig. 6, thereby exposing or arranging for use two scraping edges.

When plate 18ª is arranged on top of flange 12ª and ears 21, the smaller ears 20 are engaged in shallow notches 22 that are formed in the ends of the scraping plate.

In the construction illustrated in Figs. 7, 8 and 9, the pocket 12 is dispensed with and the scraping plate 18ᵇ occupies a permanent position on the plate 10ᵇ with the ends of said scraping plate positioned beneath ears 17ᵇ and with smaller ears 20ᵇ engaging in notches that are formed in the ends of said scraping plate.

Thus the carrying plate always has two scraping edges exposed or in position for use.

In the construction illustrated in Figs. 10, 11 and 12, the ears 13ª are provided with slots 23 for the reception of the shanks of the screw eyes 19ª, thereby permitting the brush to move away from the holder as illustrated by dotted lines in Fig. 12, while the brush is being turned from one position to the other.

The brush back may be square in cross section, as illustrated in Figs. 2, 3 and 12 or the rear corners of said back may be rounded as illustrated in Figs. 5, 6, 8 and 9.

In Fig. 15 the brush back 15 is illustrated as being formed with a rounded portion and, where it is so constructed, the screw 14 passes through an aperture in the center of ear 13 and such arrangement permits the brush to be turned from one position to the other.

The form of device illustrated in Figs. 13 and 14 is very similar to the form shown in Figs. 7, 8 and 9 with the exception that the scraping blade is relatively long and narrow.

A combination brush and scraper of my improved construction is comparatively simple, may be easily and cheaply produced, is very compact and provides a very convenient and effective tool for scraping, cleaning the surfaces of butchers' blocks, meat-cutting tables and the like.

It will be understood that minor changes in the size, form and construction of the various parts of my improved combination brush and scraper may be made and substituted for those herein described without departing from the spirit of the invention, the scope of which is set forth in the appended claims.

I claim as my invention:

1. In a combination tool, a plate, ears formed on the ends of said plate adjacent to one side thereof, which ears are adapted to serve as points of attachment for a brush back, and means secured to and projecting inwardly from the ends of said plate adjacent to said ears for engaging and holding a scraping blade.

2. In a combination tool, a plate, ears projecting from the ends of said plate adjacent to one side thereof and at right angles to said plate, which ears form points of support for a brush back, and inwardly turned lips on the ends of said plate, which lips are adapted to receive and retain a scraping blade.

3. In a combination brush and scraper, a plate, ears projecting from the ends of said plate adjacent to one side thereof and at right angles to said plate, said ears being provided with slots that are adapted to receive brush back supporting pivots and inwardly turned lips on the ends of said plate, which lips are adapted to receive and retain a scraping blade.

In testimony whereof I affix my signature.

GEORGE W. STEIN.